(12) United States Patent
Han et al.

(10) Patent No.: US 10,043,618 B2
(45) Date of Patent: Aug. 7, 2018

(54) MULTI-LAYER KEYCAP

(71) Applicant: Logitech Europe S.A., Lausanne (CH)

(72) Inventors: Zhaoyang Han, Epalinges (CH); Chih-Wei Chen, Morges (CH); Changliang Li, Suzhou (CN); Lijuan Chang, Suzhou (CN)

(73) Assignee: Logitech Europe S.A., Lausanne (CH)

( * ) Notice: Subject to any disclaimer, the term of this patent is extended or adjusted under 35 U.S.C. 154(b) by 59 days.

(21) Appl. No.: 15/072,201

(22) Filed: Mar. 16, 2016

(65) Prior Publication Data
US 2017/0271102 A1 Sep. 21, 2017

(51) Int. Cl.
| | |
|---|---|
| *H01H 13/70* | (2006.01) |
| *H01H 13/705* | (2006.01) |
| *H01H 3/12* | (2006.01) |
| *H01H 11/00* | (2006.01) |
| *B29C 47/06* | (2006.01) |
| *B29K 75/00* | (2006.01) |
| *B29L 31/46* | (2006.01) |

(52) U.S. Cl.
CPC ........... *H01H 13/705* (2013.01); *B29C 47/06* (2013.01); *H01H 3/122* (2013.01); *H01H 11/00* (2013.01); *B29K 2075/00* (2013.01); *B29L 2031/466* (2013.01)

(58) Field of Classification Search
CPC ...... H01H 13/705; H01H 3/122; H01H 11/00; H01H 2239/074; H01H 2203/008; H01H 2207/01; H01H 2219/03; H01H 2219/048; H01H 2219/056; H01H 2221/00; H01H 2223/038; H01H 2227/036; H01H 2231/002; H01H 2231/012; H01H 2231/016; H01H 2231/052; H01H 2239/006; H01H 1/00; H01H 13/04; H01H 13/83; H01H 13/023; H01H 13/70; H01H 13/702–13/704; B05D 1/02; B05D 1/28; B23K 26/362; B23K 26/402; B23K 2203/172; B29K 2075/00; B29L 2031/466
USPC ......... 200/344, 5 A, 5 R, 5 D, 5 E, 17 R, 18, 200/293, 294, 296, 297, 308, 310–314, 200/317, 341; 345/173
See application file for complete search history.

(56) References Cited

U.S. PATENT DOCUMENTS

| | | | | |
|---|---|---|---|---|
| 5,278,372 A | * | 1/1994 | Takagi | ............... H01H 3/125 200/344 |
| 2012/0222947 A1 | * | 9/2012 | Chang | ............... H01H 13/83 200/517 |

FOREIGN PATENT DOCUMENTS

CN 202067710 U * 12/2011

* cited by examiner

*Primary Examiner* — Anthony R. Jimenez
(74) *Attorney, Agent, or Firm* — Kilpatrick Townsend and Stockton

(57) ABSTRACT

Embodiments describing a method of forming a multi-layered keycap structure are disclosed herein. The method includes forming a first polymer layer on a second polymer layer, wherein the first polymer layer includes a first color and the second polymer layer includes a second color, and coupling the first polymer layer and second polymer layer to a substrate layer such that the first polymer layer is closer to the substrate than the second polymer layer. The method may further include forming a third polymer layer on the second polymer layer; and etching the multi-layered keycap structure to form an opening having a bottom surface that exposes at least one of the first or second color.

8 Claims, 8 Drawing Sheets

MULTI-LAYER KEYCAP

BACKGROUND

Input devices for modern computer systems are typically used to convert analog inputs (e.g., touches, clicks, motions, gestures, button presses, etc.) into digital signals for computer processing. An input device can include any device used to provide data and control signals to an information processing system such as a computer. Some non-limiting examples of input devices include keyboards, key pads, computer mice, remote controls, gaming controllers, joysticks, and the like.

Input devices, such as keyboards, comprise a series of keys and/or buttons. When pressed, each key may generate an input signal to a computer. To indicate what type of input signal is generated when the key is pressed, a symbol, e.g., a letter of the alphabet, may be located on the keys. The symbol may correspond to the type of input signal generated when the key is pressed. Currently, symbols are printed on keycaps for respective keys. Each symbol is printed on a keycap in a liquid form (e.g., as in an ink) in a desired symbol and then hardened. The hardened symbol remains attached to the top surface of the keycap.

The printed symbols may have different colors or different shades of colors depending on design. Typical methods of printing colored symbols include using different colored inks to print the symbols. Once printed, the colored ink hardens and forms the colored symbol on the keycap.

One common issue with such printed symbols is that they wear away with extended use. When the symbols wear away, the keys fail to indicate to the user what type of input signal is generated when pressed. If not completely worn, then the symbols may be faded, giving the keyboard a low-quality look and feel. Thus, improvements to such input devices are desired.

BRIEF SUMMARY

Embodiments are directed to apparatuses and methods of forming a durable symbol for a key of an input device. The method may also enable the symbol to have a desired color according to design. The method includes forming a multi-layered structure over a substrate, where each layer of the multi-layered structure may be formed of a different color. The multi-layered structure may then be etched with a pattern representing a symbol for a key of an input device. Depending on the depth of the etch, the resulting symbol may appear to have a certain color. Additionally, a surface treatment can be performed to brighten or darken the color, thereby enabling access to a broader range of colors.

In embodiments a method of forming a multi-layered keycap structure includes forming a first polymer layer on a second polymer layer, wherein the first polymer layer includes a first color and the second polymer layer includes a second color; and coupling the first polymer layer and second polymer layer to a substrate layer such that the first polymer layer is closer to the substrate than the second polymer layer. In certain embodiments, the method may further include forming a third polymer layer on the second polymer layer; and etching the multi-layered keycap structure to form an opening having a bottom surface that exposes at least one of the first or second color. The second polymer layer may be a supplemental layer having a thickness that is half of a thickness of the third polymer layer, and having a color that is complementary to a laser beam that is used to perform the etching of the multi-layered keycap structure. In embodiments, the first, second, and third polymer layers may be dry polyurethane (PU) layers. In some embodiments, the first, second, and third polymer layers may be formed by at least one of lamination, co-extrusion, wet coating, spray coating, or roller coating.

In embodiments, etching the keycap structure to expose at least one of the second color may include: removing at least a portion of the third polymer layer; and treating a surface of the second polymer layer; and wherein etching the keycap structure to expose at least one of the first color includes: removing at least a portion of both the second polymer layer and the third polymer layer; and treating a surface of the first polymer layer. In certain embodiments, removing at least a portion of the third polymer layer and removing at least a portion of the second polymer layer may be performed by laser ablation. The laser ablation may be performed by a laser beam having a set of parameters including pulse, energy, and time suitable to burn away at least one of the second or third polymer layers. In embodiments, treating the surface of the first or second polymer layers may be performed by a laser beam having a set of parameters including pulse, energy, and time suitable to alter at least one of the first or second polymer layers. In embodiments, altering at least one of the first or second polymer layers may include foaming or carbonizing the at least one of the first or second polymer layers with the laser beam. In some embodiments, the method further includes forming a wet polymer layer on the substrate and under the first polymer layer. The wet polymer layer may be formed to be more porous than the first polymer layer and the second polymer layer.

In embodiments, a keycap structure may include a substrate layer; and a multi-layered structure on the substrate layer, wherein the multi-layered structure comprises: a first polymer layer of a first color disposed on the substrate layer; and a second PU layer of a second color disposed on the first polymer layer. The keycap structure may further include an opening formed within the multi-layered structure. The opening may have a bottom surface that exposes the first polymer layer. In some embodiments, the keycap structure may further include a third polymer layer of a third color disposed on the second polymer layer; and a wet polymer layer on the substrate layer and under the first polymer layer. The first polymer layer, the second polymer layer, and the third polymer layer may be dry polyurethane (PU) layers. In some embodiments, the wet polymer layer may be more porous than the dry PU layers. In some embodiments, the first color, the second color, and the third color may be different colors.

In embodiments, an input device may include a support plate; a mechanism coupled to the support plate; an inner keycap coupled to the support plate by the mechanism; a substrate layer having a bottom surface and a top surface, wherein the inner keycap is attached to the bottom surface; and a keycap coupled to the top surface of the substrate layer, wherein the keycap comprises: a substrate layer; and a multi-layered structure on the substrate layer, wherein the multi-layered structure includes a first polymer layer of a first color disposed on the substrate layer and a second polymer layer of a second color disposed on the first polymer layer.

DETAILED DESCRIPTION

Methods and apparatuses discussed herein may be used to form keys and/or buttons for input devices. For instance, a method may be used to form a symbol on a keycap for a key on a keyboard. The symbol may correspond to an input signal generated by a key of a keyboard when the key is depressed. In embodiments, the method includes forming a multi-layered structure over a substrate, and then subsequently etching the multi-layered structure to form a pattern in the shape of a symbol. The multi-layered structure may be part of a keycap for the keyboard. In some embodiments, a surface treatment may be performed to alter a color of the etched symbol.

I. Electronic Devices

Figure 1:
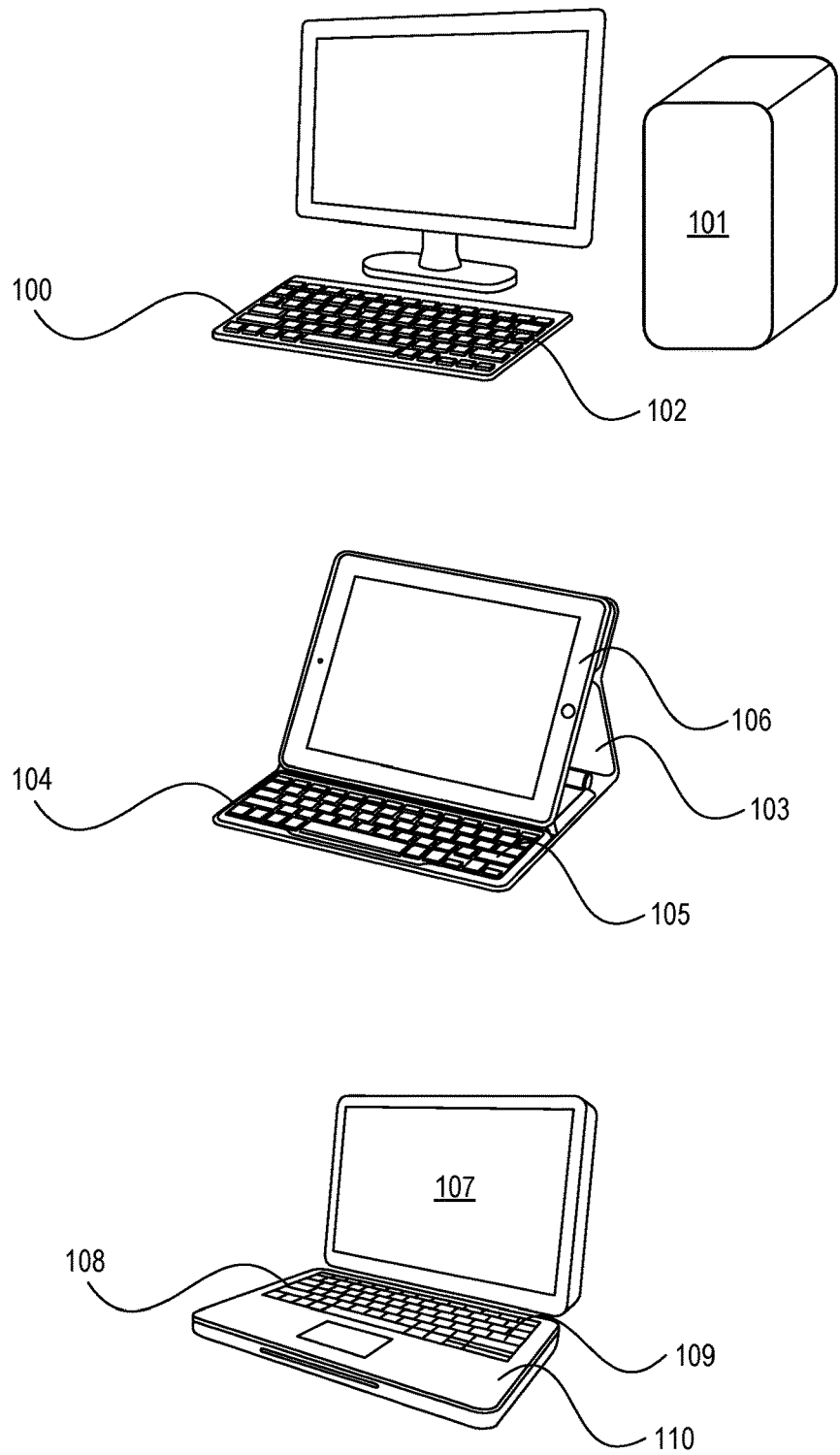
FIG. 1 is a simplified diagram of electronic devices suitable for operation with a keyboard, according to certain embodiments.

According to embodiments, keycaps formed by methods discussed herein may be part of a keyboard for an electronic device. Some exemplary electronic devices are shown in FIG. 1. In one example, an exemplary electronic device may be a personal desktop computer 101. A keyboard 100 having keys 102 with keycaps formed according to methods discussed herein may be used as an input device for personal desktop computer 101. As shown, keyboard 100 may be a separate device that is configured to couple with a central processing unit (not shown) disposed in personal desktop computer 101. The central processing unit may receive inputs from keyboard 100 when keys 102 are depressed.

Another exemplary electronic device may be a mobile tablet device 106. In embodiments, mobile tablet device 106 may be coupled to an external keyboard 104 having keys 105 with keycaps formed by methods discussed herein. Although mobile tablet device 106 may be a touchscreen device that can receive inputs from a user, keyboard 104 may be interfaced with mobile tablet device 106 to provide a physical means through which a user may generate inputs for the mobile tablet device 106. In embodiments, keyboard 104 may be attached to a protective cover 103 for protecting mobile tablet device 106 during use. Protective cover 103 may be attached to mobile tablet device 106 through magnetic coupling or a physical attachment mechanism. A central processing unit disposed within mobile tablet device 106 may receive inputs from keyboard 104 when keys 105 are depressed.

In addition to personal desktop computer 101 and mobile tablet device 106, another exemplary electronic device may be a laptop computer 110. Laptop computer 110 may include a keyboard 108 formed as part of laptop computer 110. As shown, laptop computer 110 may be structured in a clam shell-like configuration that opens to allow a user to operate laptop computer 110 and closes to protect delicate components of laptop computer 110, such as a display 107 and keyboard 108. Keyboard 108 may include keys 109 having keycaps formed by methods discussed further herein. A central processing unit located within laptop computer 110 may receive inputs from keyboard 108 when keys 109 are depressed.

Although FIG. 1 only shows the input device as a keyboard, embodiments herein may be applied to any input device for an electronic device, such as key pads, computer mice, remote controls, gaming controllers, joysticks, and the like.

II. Keys

The illustrations in FIG. 1 show that a keyboard can be used by various electronic devices. However, each keyboard in FIG. 1 is broadly shown as a device that has a plurality of keys. The keyboards lack detail to which embodiments of the present invention are directed. As such, the following description discusses in detail the structure of an exemplary keyboard and its keys, according to embodiments of the present invention.

Figure 2:
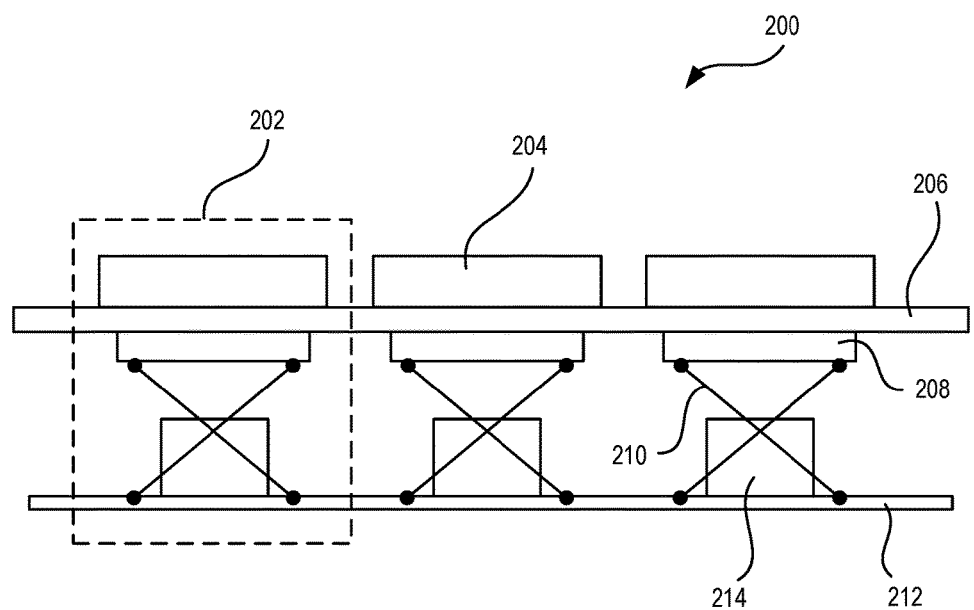
FIG. 2 is a simplified illustration of a cross-sectional view of a plurality of keys across a portion of a keyboard, according to certain embodiments.

FIG. 2 illustrates a cross-sectional view of a plurality of keys 202 across a portion of a keyboard 200, such as any of keyboards 100, 104, and 108. Each key 202 may include a keycap 204 coupled to a top side of a substrate 206, and an inner keycap 208 coupled to a bottom side of substrate 206. Inner keycap 208 may be coupled to a spring-like mechanism 210 (e.g., a scissor structure), which sits above a supporting plate 212. A switching mechanism 214 is disposed below inner keycap 208 and on top of supporting plate 212. Switching mechanism 214 may be any suitable collapsible structure, such as a rubber or metal dome, that can close a switch when depressed to generate a key press. It is to be appreciated that FIG. 2 merely illustrates one exemplary configuration of a key for a keyboard, and that the illustration is not intended to be limiting. One skilled in the art understands that there may be many other types of keys whose keycaps may be formed according to embodiments herein and that embodiments are not limited to the illustration shown in FIG. 2. In fact, a keycap for any type of key, button, switch, and the like can be utilized by embodiments herein. For instance, instead of using a key having scissor structure 210, a key having a cantilever beam may be used instead. In another example, a solid state key may be used in other embodiments. The solid state key may not utilize a mechanism to generate a key press. Rather, two conductive layers may make contact with one another to generate a key press, as discussed in more detail in U.S. patent application Ser. No. 14/840,877, which is incorporated by reference in its entirety for all purposes.

Figure 3:
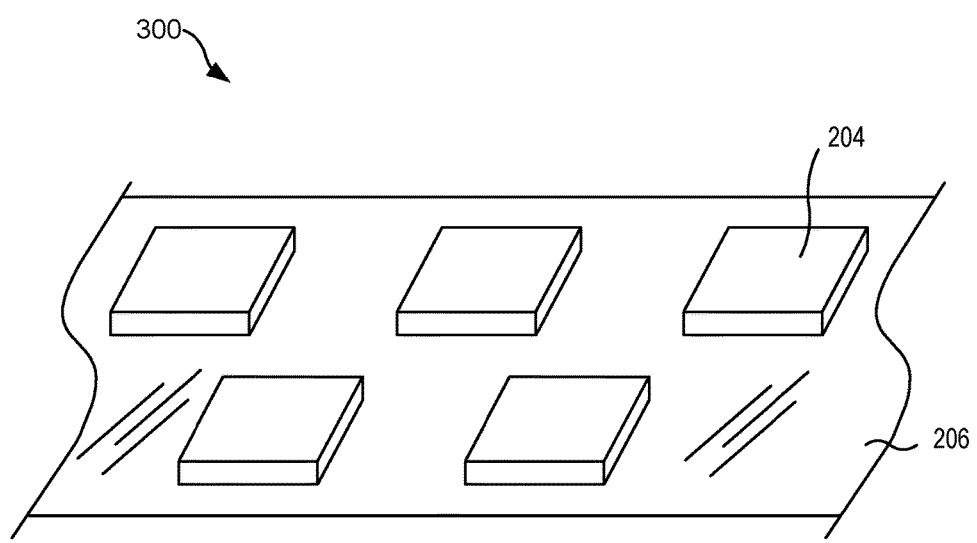
FIG. 3 is a simplified illustration of a top perspective view of a plurality of keycaps on a substrate, according to certain embodiments.

Although illustrated as having only three keys 202, it is to be understood that keyboard 200 may include more or less than three keys and that the illustration shown in FIG. 2 is only a portion of an entire keyboard. Additionally, one skilled in the art understands that FIG. 2 is a cross-sectional view and that other keys may be located in front of or behind keys 202 but are just not shown. For example, FIG. 3 illustrates a top perspective view of an exemplary keyboard 300 according to embodiments of the present invention. Keycaps 204 may be arranged around one another, e.g., beside, in front of, and/or behind one another. In some embodiments, keycaps 204 positioned in front of and behind one another may be arranged in a staggered arrangement. In certain embodiments, keycaps 204 are arranged in a standard QWERTY keyboard arrangement. FIG. 3 may only show keycaps 204 and substrate 206 as inner keycap 208, spring-like mechanism 210, supporting plate 212, and switching mechanism 214 may be hidden from view by substrate 206 and/or keycaps 204.

In embodiments, keycaps 204 are attached to substrate 206 such that keycaps 204 are prevented from sliding in the horizontal direction. Each keycap 204 may correspond to a specific symbol, such as a letter of the alphabet, an operand for a mathematical equation, and the like. Each key associated with corresponding keycaps 204 may generate an input signal associated with the corresponding symbol. According to embodiments of the present invention, corresponding symbols may be etched into keycaps 204. In embodiments, keycaps 204 may include a multi-layered structure that can be etched to form the symbol, as will be discussed in detail further herein.

III. Kyecap

A keycap is a covering for a key of a keyboard. The keycap may be formed of a stiff material suitable to withstand pressure applied by a user. In some embodiments, the material can be any suitable natural or synthetic membrane material for forming a keycap or a keyframe. For instance, the keycap may be formed of a polymer such as, but not limited to, polyurethane (PU), thermoplastic polyurethane (TPU), polyvinyl chloride (PVC), polyethylene terephthalate (PET), polyester, and other similar materials that can be burned away by a laser, etched away by a chemical, or removed by any physical means, e.g., cutting and carving. Additionally, the keycap may have a structure that includes a stiff surface upon which a user may apply downward force to depress the key and generate a key press. Upon effectuation of the key press, a switch may be activated to generate an input signal to an electronic device.

A. Keycap Structure

Keycaps are important to the interaction between the user and the electronic device because not only do they provide surfaces upon which force may be applied, but they also provide surfaces within which symbols may be located to inform the user what type of input signals are generated when the keys are pressed. Typically, a symbol is printed on a top surface of each keycap for a keyboard. This results in a printed symbol that can be easily worn off or removed from the top surface of the keycap. However, embodiments of the present invention include etched patterns in a keycap. The resulting etched pattern resembles a symbol and is more durable than a printed symbol. For instance, etched symbols do not bleed and may have sharper lines, resulting in a sharper, clearer symbol. According to embodiments, the structure of the keycaps enable a keycap to be etched to form a symbol of a desired color, as will be discussed further herein.

Figure 4:
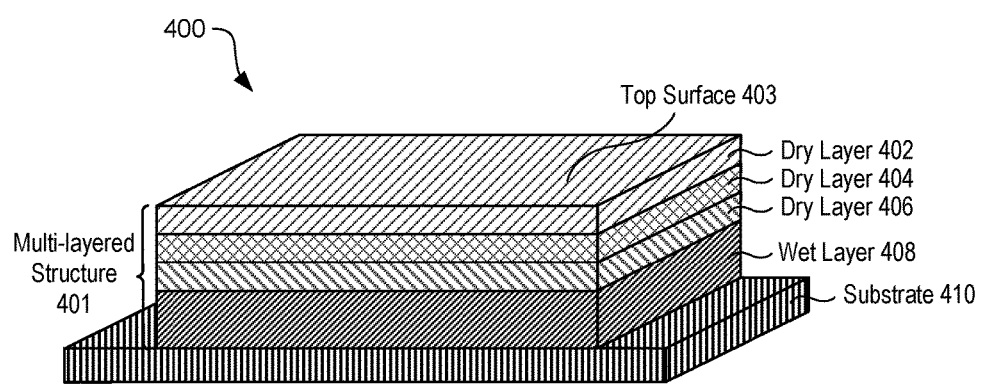
FIG. 4 is a detailed illustration of a perspective view of a keycap on a substrate, according to certain embodiments.

FIG. 4 is a detailed perspective view of an exemplary keycap 400 disposed on a substrate 410, according to certain embodiments. Keycap 400 may have a top surface 403 upon which force may be applied to generate a key press. Keycap 400 may be structured according to keyboard design, such as a structure having a rectangular shape with a substantially planar top surface 403 and sharp corners. Other embodiments, however, are not limited to such structural configurations. As an example, other embodiments may have non-planar top surfaces 403 (e.g., concave, convex, or a mixture of both) and may have rounded corners. Additionally, other embodiments may have non-rectangular shapes, such as rounded, ovular, triangular, or any other shape as designated by design.

According to embodiments of the present invention, keycap 400 includes a multi-layered structure 401 formed of more than two individual layers. Each layer of multi-layered structure 401 may be stacked one upon the other to form an overall structure that resembles keycap 400. Each layer of multi-layered structure 401 may be unique, in that no two layers are exactly the same. For instance, some layers may be substantially similar in structure and composition, but may be different in color. Other layers may be substantially different in structure and composition. In embodiments, multi-layered structure 401 is formed of two or more dry layers and one or more wet layers.

In some embodiments, multi-layered structure 401 may be implemented in a backlit configuration where multi-layered structure 401 has transparent properties that allow light to transmit through at least a portion of its structure. In such embodiments, the wet layer of multi-layered structure 401 is optional because the wet layer may reduce transparency by diffusing light. Thus, in some embodiments, multi-layered structure 401 may not include a wet layer. In other embodiments multi-layered structure 401 may include a modified wet layer for backlit applications. The modified wet layer may be configured to have a thickness and a transparency that is suitable to allow transmission of light through multi-layered structure 401. As an example, the modified wet layer may be a transparent cast material formed of PU or acrylic.

1. Dry Layers

As further shown in the exemplary embodiment of FIG. 4, multi-layered structure 401 may be formed of dry layers 402, 404, and 406. Dry layers 402, 404, and 406 may be layers of dense, stiff material suitable to withstand pressure applied by a user to generate a key press. For instance, dry layers 402, 404, and 406 may be formed of PU. Each dry layer 402, 404, and 406 may be formed of a different color. That is, the color of dry layer 402 may be different than the respective colors of dry layers 404 and 406. Likewise, the color of dry layer 404 may be different than the respective colors of dry layers 402 and 406, and the color of dry layer 406 may be different than the respective colors of dry layers 402 and 404. For instance, in an embodiment, dry layer 402 may be red, dry layer 404 may be blue, and dry layer 406 may be white. Thus, when one or more dry layers 402, 404, and 406 are etched to form a symbol for keycap 400, the color of the symbol may be determined by the depth of the etch and which dry layer is exposed, as will be discussed in further detail herein. In embodiments, each dry layer 402, 404, or 406 may have a minimal thickness sufficient to completely coat an underlying layer. The thinner the dry layer, the easier and faster it may be to etch through the layer to reach a desired underlying dry layer. As an example, wet layer 408 may have a thickness between 0.05 and 0.3 mm. In some embodiments, wet layer 408 may have a thickness between 0.05 and 0.1 mm.

In embodiments, top dry layer 402 may be substantially exposed when implemented on a keyboard. Thus, top dry layer 402 may have a surface treatment to achieve a desired keyboard appearance. For example, top dry layer 402 may have a polished surface, matted surface, and any other desired textured surface.

In certain embodiments, multi-layered structure 401 may include a supplemental dry layer. The supplemental dry layer may be a dry layer that is disposed below another dry layer, e.g., an upper dry layer, and be configured to minimize the bleeding of color from the upper dry layer when the upper dry layer is exposed to a laser beam according to embodiments herein. As shown in FIG. 4, dry layer 404 may be a supplemental layer disposed below upper dry layer 402. Thus, dry layer 404 may prevent the color of dry layer 402 from bleeding into dry layer 406 when multi-layered structure 401 is exposed to a laser beam. The supplemental dry layer 404 may be disposed between dry layer 402 and dry layer 406.

The supplemental dry layer may have a thickness and color that is suitable to absorb laser energy to catalyze the burning away of the upper dry layer. For instance, the supplemental dry layer may have a thickness that is less than the thickness of the upper dry layer. In a particular example, the supplemental dry layer may have a thickness that is approximately half the thickness of the upper layer. Additionally, the supplemental dry layer may have a color that is tailored to a wavelength of a laser beam used to etch the upper dry layer. As an example, if a laser beam having a wavelength in the spectrum of a green color is used to remove/burn portions of the upper layer, then the supplemental dry layer may have a color that is complementary to green, such as the color yellow. A complementary color is a color that has the reverse spectrum of an original color that, when combined with the original color, forms the color white.

2. Wet Layers

In addition to dry layers 402, 404, and 406 as shown in FIG. 4, multi-layered structure 401 may also include wet layer 408. Wet layer 408 is disposed below dry layers 402, 404, and 406, and above substrate 410. That way, wet layer 408 may serve as a barrier between dry layer 402, 404, and 406 and substrate 410. Unlike dry layers 402, 404, and 406, wet layer 408 may be formed of a material that is less dense than dry layers 402, 404, and 406. As an example, wet layer 408 may be formed of a porous PU material that can bend or morph in shape as force is applied to dry layers 402, 404, and 406. The PU structure of dry layers 402, 404, and 406 may be less porous than the structure of wet layer 408. In a particular example, wet layer 408 is PU foam. Having such structural characteristics allows wet layer 408 to perform as a cushioning layer and/or an impact resistance layer. When a user presses upon keycap 400, wet layer 408 may provide a soft feel, thereby enhancing user experience and/or maximizing user comfort. In embodiments, wet layer 408 may have a thickness suitable to enable cushioning and impact resistance. For instance, wet layer 408 may have a thickness between 0.3 and 5 mm. In certain embodiments, wet layer 408 may have a thickness between 0.3 and 3 mm.

B. Keycap Symbol

As discussed herein, a keycap may include a symbol. The symbol may inform a user about what type of input signal is generated when the key is pressed. According to some embodiments, instead of printing a symbol on a top surface of a keycap, the symbol is etched into a multi-layered structure of a keycap. Implementation of the multi-layered structure discussed in embodiments herein do not require the use of colored ink to form a symbol of a desired color on a keycap, as will be discussed in the following description.

Figures 5A, 5B:
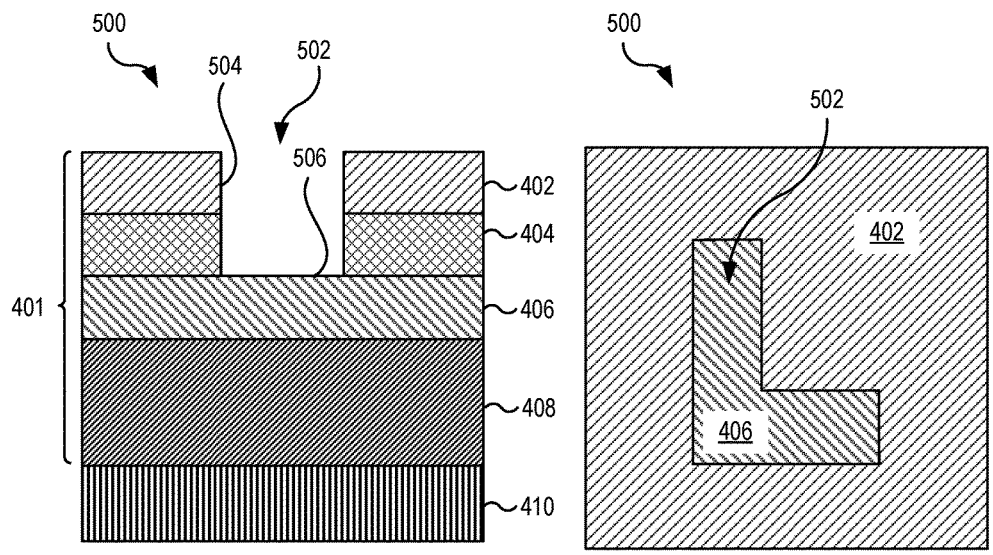
FIG. 5A is a simplified diagram illustrating a cross-sectional view of a keycap on a substrate with an etched symbol having vertical sidewalls, according to certain embodiments.
FIG. 5B is a simplified diagram illustrating a top-down view of a keycap on a substrate with an etched symbol having vertical sidewalls, according to certain embodiments.

FIGS. 5A and 5B illustrate a keycap 500 having an etched symbol according to embodiments of the present invention. Specifically, FIG. 5A illustrates a cross-sectional view of keycap 500, and FIG. 5B illustrates a top-down view of keycap 500. The etched symbol as illustrated in FIGS. 5A and 5B is a letter of the alphabet, i.e., the capital letter "L", for ease of explanation, although one skilled in the art understands that embodiments are not limited to such symbols, and that any symbol may be used. For example, the symbol may be any other letter of the alphabet, a number, a mathematic operand, a Greek symbol, and the like.

As shown in FIG. 5A, an opening 502 is etched into at least a portion of multi-layered structure 401. Opening 502 may have a bottom surface 506 that exposes one of dry layers 402, 404, or 406. Additionally, opening 502 may be in a shape that resembles the desired symbol, such as the letter "L" as shown in the top-down perspective of keycap 500 in FIG. 5B. As discussed herein with respect to FIG. 4, each dry layer 402, 404, and 406 may have a different color. Thus, depending on the depth of opening 502, the etched symbol may appear to have a specific color. For example, opening 502 extends to a depth where bottom surface 506 exposes dry layer 406. Thus, the resulting symbol may appear to have color determined by the color of dry layer 406. Continuing with the embodiment discussed herein with respect to FIG. 4 where dry layer 402 is red, dry layer 404 is blue, and dry layer 406 is white, the resulting symbol formed by patterned opening 502 may thus appear to be white.

The depth of opening 502 shown in FIG. 5A is merely one non-limiting embodiment. It is to be appreciated that other embodiments may have depths that are deeper or shallower than the depth of opening 502. The different depths may result in symbols that appear to have different colors. For instance, opening 502 may have a depth that does not extend all the way down to dry layer 406. Instead, opening 502 may have a depth that exposes dry layer 404. In such embodiments, the resulting symbol may appear to have a color determined by the color of dry layer 404. As an example, where dry layer 402 is red, dry layer 404 is blue, and dry layer 406 is white, having a depth of opening 502 that exposes dry layer 404 may result in a symbol having a blue color. Having different colored dry layers 402, 404, and 406 allows flexibility in the design of keycap 500. A desired color may be achieved by simply altering the depth of opening 502.

Although FIG. 5A shows opening 502 exposing a top surface of dry layer 406, it is not necessary for opening 502 to expose a top surface of dry layer 406. Instead, opening 502 may extend into a portion of dry layer 406 such that the opening 502 does not extend all the way through dry layer 406. In such embodiments, opening 502 may extend through dry layer 402 and dry layer 404, but may not extend completely through dry layer 406. In such cases, the etched symbol may have a substantially similar appearance to an etched symbol whose opening has a bottom surface that exposes a top surface of dry layer 406. In embodiments, the bottom surface is substantially planar such that the exposed surface uniformly colored.

Opening 502 may have sidewalls 504. As shown in FIG. 5A, sidewalls 504 may be substantially vertical in profile. The vertical profile may result from the way opening 502 was formed. For example, the substantially vertical sidewalls 504 may be formed by an anisotropic etch process. The anisotropic etch process may remove dry layers 402 and 404 more quickly in the vertical direction than the horizontal direction, thereby resulting in an opening with substantially vertical sidewalls 504. With substantially vertical sidewalls 504, the etched symbol may have a more dramatic contrast with the rest of the keycap 500 when viewed from above, as shown in FIG. 5B. Specifically, dry layer 406 may appear to abut dry layer 402 when viewed from above.

Figures 6A, 6B:
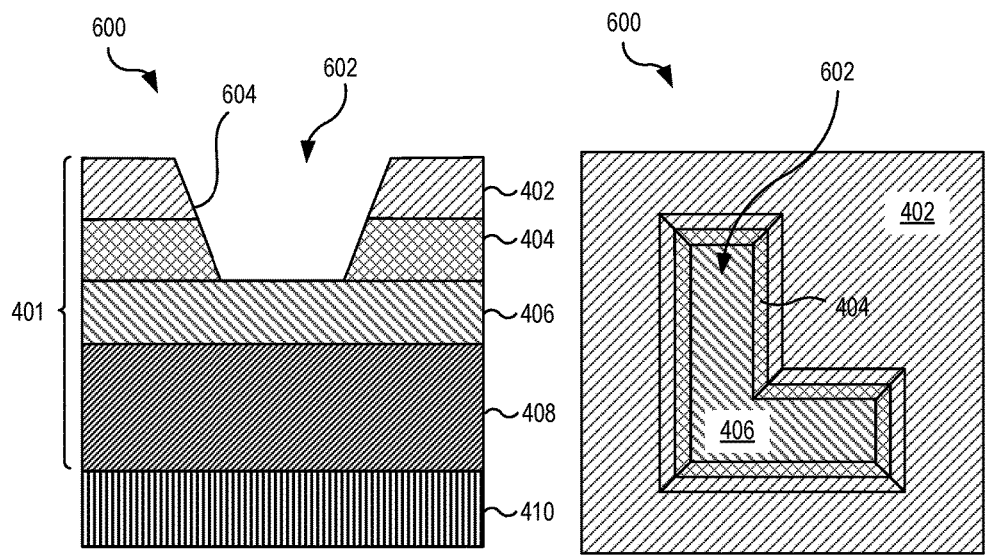
FIG. 6A is a simplified diagram illustrating a cross-sectional view of a keycap on a substrate with an etched symbol having slanted sidewalls, according to certain embodiments.
FIG. 6B is a simplified diagram illustrating a top-down view of a keycap on a substrate with an etched symbol having slanted sidewalls, according to certain embodiments.

Other etch methods may form different contrasts between an etched symbol and its surrounding keycap. FIGS. 6A and 6B illustrate an embodiment where there is a gradient or a border between the etched symbol and its surrounding keycap. FIG. 6A, illustrates a cross-sectional view of keycap 600, and FIG. 5B illustrates a top-down view of keycap 600. Keycap 600 may include an opening 602 having slanted sidewalls 604. Opening 602 may extend through dry layers 402 and 404 to expose dry layer 406.

In embodiments, slanted sidewalls 604 may result in an etched symbol that appears to have a border or a gradient between the etched symbol and its surrounding keycap as shown in FIG. 6B. From the top-down view, dry layer 404 appears to be a border that surrounds exposed regions of dry layer 406. In the example where dry layer 402 is red, dry layer 404 is blue, and dry layer 406 is white, the resulting etched symbol may appear to be white surrounded by a blue border on a red keycap. It is to be appreciated that more layers may be implemented to form a more gradual color change between the etched symbol and the surrounding keycap. For example, five dry layers may be implemented where an opening exposes the bottom/fifth dry layer. The fourth through second layers may each have a shade of white that progressively gets darker. Thus, the top perspective view may appear to have a white etched symbol that has edges that blur into the first dry layer, i.e., the surrounding keycap. In certain embodiments, a surface of an exposed dry layer may be modified to alter its original color, as will be discussed in further detail herein with respect to the discussion of the method of forming a symbol on a keycap.

It is to be appreciated that FIGS. 5A-5B and 6A-6C are not drawn to scale. Actual implementations and formation of a keycap according to embodiments herein may have heights and widths that vary from what is shown.

IV. Method of Forming a Symbol on a Keycap

Various methods may be used to form an etched symbol on a keycap according to embodiments of the present invention. For instance, more or less dry layers may be formed to achieve a certain appearance when the etched symbols are formed. Additionally, different etching techniques may be used to form the desired etched symbol and color. The following description with respect to FIGS. 7A-7C discusses an exemplary method of forming a symbol on a keycap, and it is to be understood that methods with trivial modifications that do not depart from the spirit and scope of the present invention are envisioned herein.

Figure 7A:
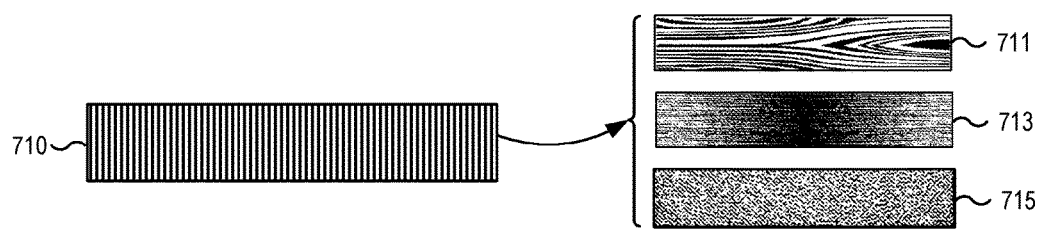
FIGS. 7A-7D illustrate a method of forming a keycap on a substrate, according to certain embodiments.

In embodiments, a substrate 710 is provided as shown in FIG. 7A. Substrate 710 may be any suitable structure upon which a keycap may be formed. For instance, substrate 710 may be a flexible substrate, such as a synthetic fabric, rubber, synthetic thermoplastic polymer, and the like. The fabric substrate may hermetically seal parts of a key disposed below the fabric substrate such that the parts are protected from the environment. Thus, in such embodiments, the keys may not be positioned through the fabric substrate but may be attached to a bottom and top surface of the fabric substrate. In some embodiments, substrate 710 may be a stiff substrate upon which a keycap may be formed. For instance, substrate 710 may be formed of wood 711, metal (e.g., brushed aluminum 713), plastic 715, or any other stiff material. In backlit embodiments, substrate 710 may be formed of a material with transparent properties. For example, substrate 710 may be formed of a thermoplastic adhesive, e.g., a hot melt adhesive (HMA), or a transparent TPU film molding with HMA together.

Figure 7B:
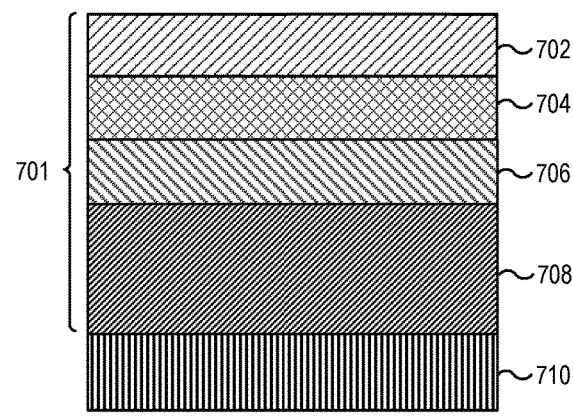

Next, in FIG. 7B, a multi-layered structure 701 may be formed on substrate 710. Multi-layered structure 701 may include two or more dry layers 702, 704, and 706 and one or more wet layer 708. Dry layers 702, 704, and 706 may be formed on top of wet layer 708. In embodiments, multi-layered structure 701 may be constructed by forming its bottom layer first and sequentially forming the individual layers until the top layer is formed. For example, wet layer 708 may first be formed on substrate 710, and then dry layers 702, 704, and 706 may be subsequently formed on wet layer 708. Dry layer 702 may be formed after dry layer 704, which may be formed after dry layer 706.

Wet layer 708 may be formed by pouring a heated and liquefied PU material on substrate 710. The liquefied PU material can consist of melted PU material. Once the liquefied PU material sets and cools, the liquefied PU material may harden and remain bonded to substrate 710. Thereafter, the cooled PU material is immersed in a solution to create pores in the cooled PU material. For example, the cooled PU material may be immersed in a water-dimethylformamide (DMF) solution. The resulting structure is porous and results in the formation of wet layer 708, which has malleable qualities that allow wet layer 708 to change shape when pressure is applied. As mentioned herein, wet layer 708 may have a thickness ranging between 0.3 to 3 mm.

Dry layers 702, 704, and 706 may be formed by any suitable technique, such as, but not limited to, lamination, co-extrusion, wet coating, spray coating, or roller coating. In embodiments, dry layers 702, 704, and 706 are formed one upon the other to form an intermediate structure that is subsequently adhered to wet layer 708 to form multi-layered structure 701. As mentioned herein, dry layers 702, 704, and 706 may each have a thickness ranging between 0.05 to 0.1 mm.

Figure 7C:
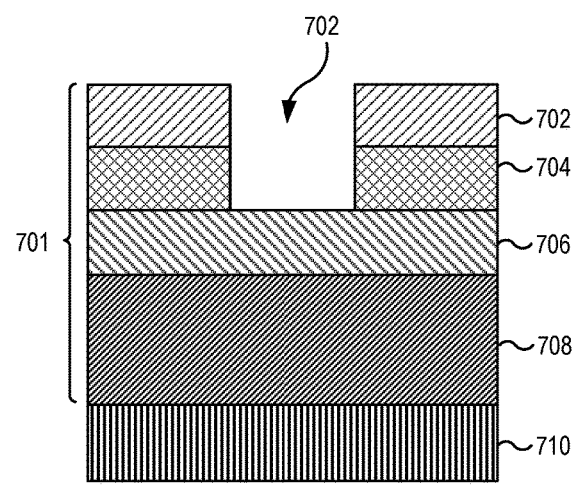

Once multi-layered structure 701 is formed, an opening 702 may be etched into a portion of multi-layered structure 701 to expose at least one of dry layers 702, 704, and 706, as shown in FIG. 7C. Opening 702 may have a pattern in the shape of a symbol as discussed herein with respect to FIGS. 5B and 6B.

In some embodiments, opening 702 may be formed by any suitable material removal process. For instance, a precise mechanical blade may be used to carve into multi-layered structure 701 to expose portions of at least one of dry layers 702, 704, and 706 to form opening 702. Alternatively, a chemical solution may be used to burn or dissolve portions of at least one of dry layers 702, 704, and 706 to form opening 702. In other embodiments, opening 702 may be formed by ultrasonic cutting that removes portions of at least one of dry layers 702, 704, and 706 to form opening 702.

In embodiments, opening 702 is formed by laser ablation. Laser ablation is performed when a high-powered laser bombards a predetermined area of multi-layered structure 701 to accurately remove a portion of multi-layered structure 701. As shown in FIG. 7C, laser ablation may be used to form opening 702, which can expose a top surface of dry layer 706. The laser ablation process may remove portions of dry layers 702 and 704 to expose dry layer 706. Portions of dry layers 702 and 704 may be removed by burning the PU from exposure to a laser beam, as shown in FIG. 7D.

Figure 7D:
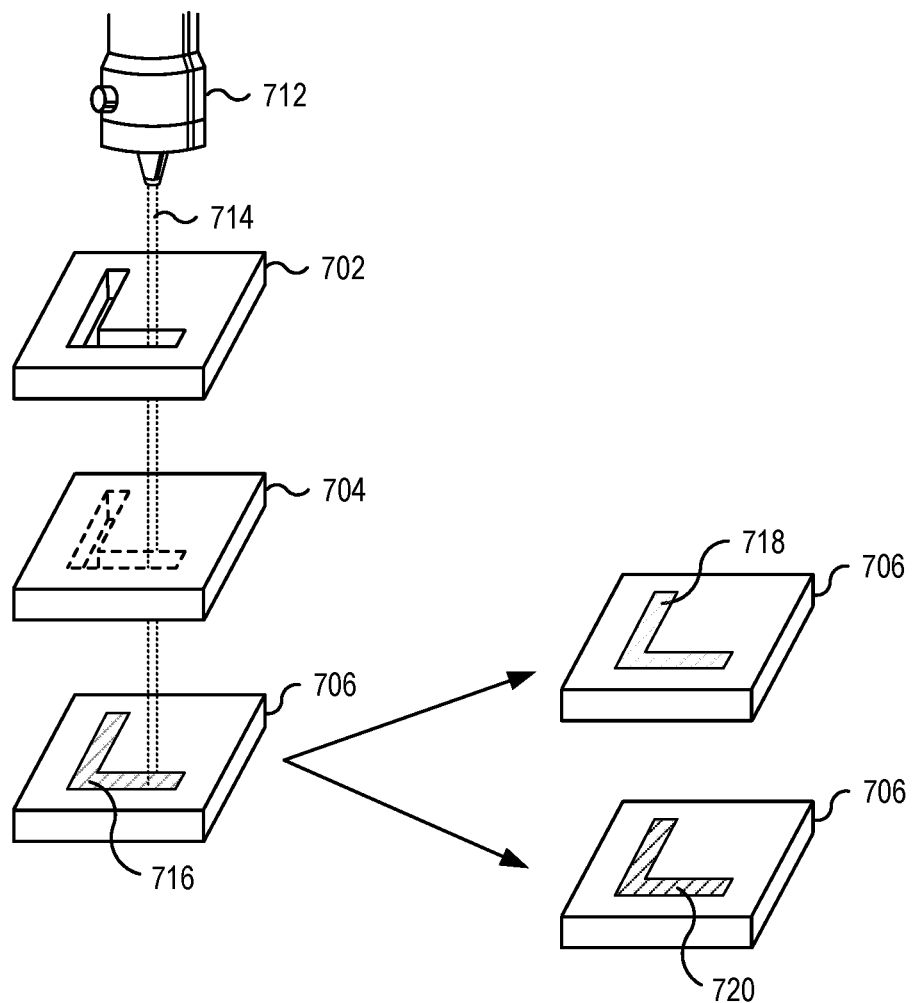

FIG. 7D is an example of how the laser ablation process creates an etched symbol according to embodiments of the present invention. A laser tool 712 may generate a laser beam 714 by exciting a source material (not shown). The laser beam may be any suitable laser beam capable of burning layers of the multi-layered structure such as a gas laser beam or a solid state laser beam. The etching characteristics of the laser beam may be determined based upon the source material as well as a set of parameters for generating the laser beam, the set of parameters include pulse frequency, energy outputted, exposure time, and the like. The source material may be any material suitable to generate a laser beam capable of removing PU material. For example, the source material may be carbon dioxide for gas laser beams or neodymium-doped yttrium aluminum garnet (Nd:YAG) and neodymium-doped yttrium orthovanadate (Nd:YVO4) for solid state laser beams.

In embodiments, laser beam 714 may burn through dry layer 702 and 704 to expose dry layer 706. Thus, the resulting etched symbol may have a color that is similar to the color of exposed dry layer 706.

According to embodiments of the present invention, laser tool 712 may perform surface treatments of dry layer 706. For example, after burning through dry layers 702 and 704, laser tool 712 may alter the set of parameters to modify laser beam 714 in a way that causes it to perform a surface treatment of dry layer 706 instead of burning through dry layer 706.

Performing a surface treatment on a dry layer may change the color of the dry layer. In an embodiment, the surface treatment may brighten the color of the dry layer. For instance, with reference to FIG. 7D, to brighten the color of dry layer 706, laser beam 714 may be modified to alter the structural makeup of dry layer 706. In an embodiment, laser beam 714 may decrease the density of a portion of dry layer 706, such as by producing a foam on a surface of dry layer 706. Laser beam 714 may utilize a lower frequency, lower power, and a shorter exposure time to lower the density of dry layer 706. As shown in FIG. 7D, a foamed surface 718 may have a lighter color than an untreated surface 716.

Alternatively, the surface treatment may darken the color of the dry layer. Darkening the color of dry layer 706 may be performed by modifying laser beam 714 to increase the density of dry layer 706, such as by carbonizing dry layer 706. One way of increasing the density of dry layer 706 is by modifying laser beam 714 to have a higher frequency, higher power, a longer exposure time, and/or a combination thereof. As shown in FIG. 7D, a carbonized surface 720 may have a darker color than the untreated surface 716. A variety of changes in parameters may yield different degrees of color change. Accordingly, laser beam 714 may be tailored to achieve a desired shade of color.

Figure 8:
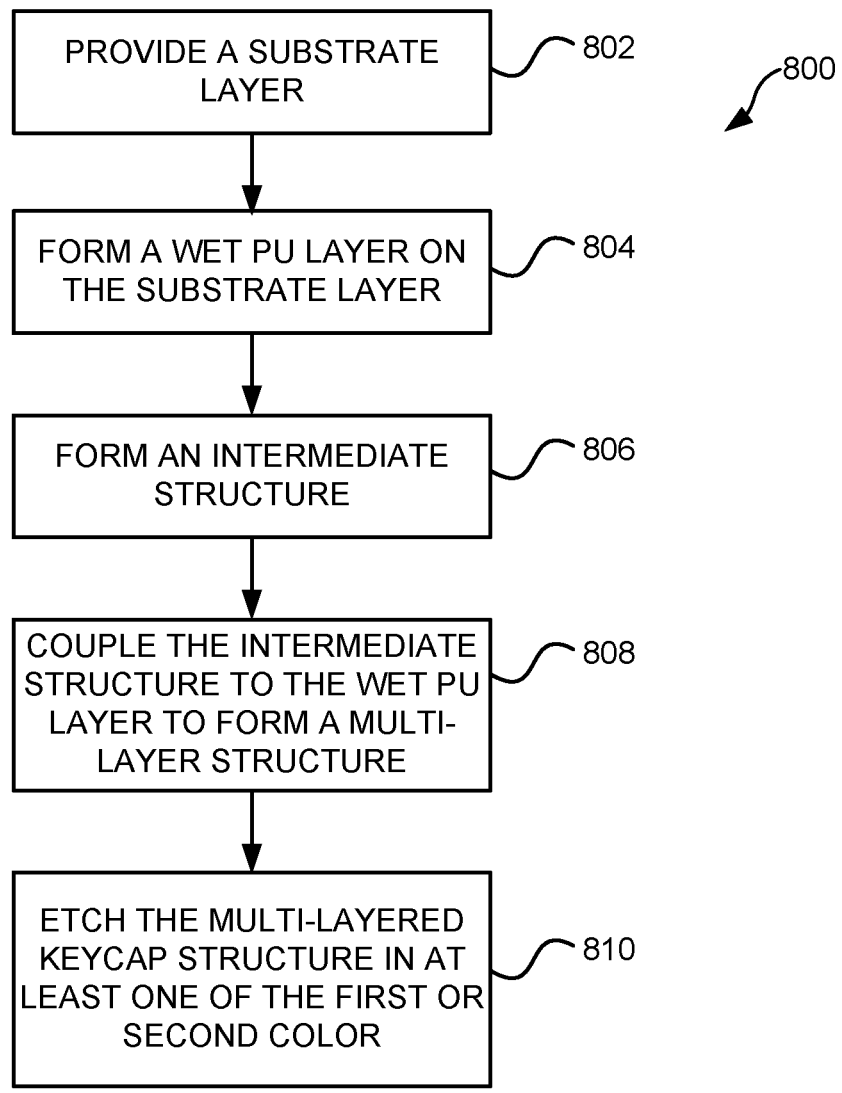
FIG. 8 is a flow chart for a method of forming a keycap on a substrate, according to certain embodiments.

FIG. 8 is a flow chart 800 for a method of forming a symbol on a keycap according to embodiments of the present invention. The method may be performed by a laser tool capable of generating gas or solid state laser beams using sources discussed herein. At block 802, a substrate layer, such as substrate 410 in FIG. 4 or substrate 710 in FIG. 7A, may be provided. The substrate layer may be formed of a flexible material, e.g., a fabric, or a stiff material, e.g., a wood or a metal. The substrate layer may be chosen by design.

At block 804, a wet polyurethane (PU) layer may be formed on the substrate layer. For instance, wet layer 408 in FIG. 4 may be formed directly on top of substrate 410, or wet layer 708 in FIG. 7 may be formed directly on top of substrate 710. Any process suitable to form a porous, malleable PU layer may be utilized to form the wet PU layer. As an example, the wet PU layer may be formed by applying a layer of heated liquid PU on the substrate and allowing the liquid PU to solidify by cooling. When cooled, the liquid PU hardens and remains affixed to the substrate. Thereafter, the cooled PU material may be immersed in a solution to create pores in the cooled PU material as discussed with respect to FIG. 7B. The resulting structure is porous and results in the formation of a layer that has malleable qualities that allow it to change shape when pressure is applied.

At block 806, an intermediate structure may be formed. The intermediate structure may include two or more dry PU layers, such as dry layers 702, 704, and 706 in FIG. 7B. Each of the two or more dry layers may be formed upon one another by lamination, co-extrusion, wet coating, spray coating, or roller coating. As mentioned herein, each dry PU layer may be formed of a different color. Each color may be created by dying the PU layer during any of the aforementioned processes. In embodiments, the resulting PU layers have a dense structure that is minimally porous and stiff. The stiffness of PU layers are suitable to withstand pressure applied by a user to generate a key press.

Once the intermediate structure is formed, at block 808, the intermediate structure may be coupled to the substrate to form a multi-layered structure according to embodiments of the present invention. The intermediate structure may be coupled directly to the wet PU layer. Any suitable attachment process may be used to couple the intermediate structure directly to the wet PU layer. As an example, the intermediate structure may be placed against the wet PU layer and then attached by applying heat and pressure. Other examples may use adhesives to attach the two structures together.

Once the multi-layered keycap structure is formed, at block 810, an opening may be etched into the multi-layered keycap structure. Any high-precision etching technique may be used to form the opening into the multi-layered keycap structure. For example, a laser ablation process may be used to remove predetermined portions of the multi-layered keycap structure to form the opening. Laser ablation may be performed by a laser tool that generates a laser according to a set of parameters. The set of parameters may dictate how the laser affects the multi-layered keycap structure. For example, the set of parameters may include a pulse, energy, and time suitable to remove the predetermined portions of the multi-layered keycap structure by burning. After such removal, the opening may have a shape that resembles a symbol for a keycap. Furthermore, the opening may have a bottom surface that exposes a portion of a PU layer of the multi-layered keycap structure.

In embodiments, etching into the multi-layered keycap structure may also include a surface treatment of the PU layer exposed at the bottom of the opening. Surface treatment of the PU layer may be performed by a laser beam generated by the laser tool according to a modified set of parameters different than the set of parameters used to generate the laser beam for removing portions of the multi-layered keycap structure. In embodiments, surface treatment of the PU layer may change the original color of the PU layer. As an example, surface treatment of the second PU layer, which is originally blue, may result in a light blue or a dark blue color. Brightening the original color may be performed by a surface treatment that creates a foam on the exposed surface of the PU layer at the bottom of the opening. On the other hand, darkening of the original color may be performed by a surface treatment that carbonizes the exposed surface of the PU layer at the bottom of the opening.

The methods discussed herein allow a keycap to be formed with a symbol that is reliable and highly resistant to wear. Because the symbol is etched into the keycap and not printed on top of the keycap as conventionally done, the symbol is not a layer or coating that can get rubbed off. Additionally, the multi-layered structure of the keycap has more than one PU layer having different colors. This allows the symbol to be formed of a certain color by etching to a specific depth where a bottom of the etched opening exposes the desired color.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A keycap structure comprising:
   a substrate layer; and
   a multi-layered structure on the substrate layer, wherein the multi-layered structure comprises:
   a base polymer layer;
   a first polymer layer of a first color disposed on the base polymer layer, wherein the base polymer layer is more malleable than the first polymer layer; and
   a second polymer layer of a second color disposed on the first polymer layer.

2. The keycap structure of claim 1, further comprising an opening formed within the multi-layered structure.

3. The keycap structure of claim 2, wherein the opening has a bottom surface that exposes the first polymer layer.

4. The keycap structure of claim 1, further comprising:
   a third polymer layer of a third color disposed on the second polymer layer.

5. The keycap structure of claim 4, wherein the first polymer layer, the second polymer layer, and the third polymer layer are dry polyurethane (PU) layers.

6. The keycap structure of claim 5, wherein the base polymer layer is more porous than the dry PU layers.

7. The keycap structure of claim 4, wherein the first color, the second color, and the third color are different colors.

8. An input device, comprising:
   a support plate;
   a mechanism coupled to the support plate;
   an inner keycap coupled to the support plate by the mechanism;
   a substrate layer having a bottom surface and a top surface, wherein the inner keycap is attached to the bottom surface; and
   a keycap coupled to the top surface of the substrate layer, wherein the keycap comprises:
   a substrate layer; and
   a multi-layered structure on the substrate layer, wherein the multi-layered structure includes a base polymer layer, a first polymer layer of a first color disposed on the base polymer layer, wherein the base polymer layer is more malleable than the first polymer layer, and a second polymer layer of a second color disposed on the first polymer layer.

* * * * *